Patented Sept. 12, 1933

1,926,786

UNITED STATES PATENT OFFICE

1,926,786

SYNTHETIC RESIN AND METHOD OF MAKING THE SAME

Emil E. Novotny, Philadelphia, Pa., and William Courtney Wilson, Chicago, Ill., assignors to John Stogdell Stokes, Huntingdon Valley, Pa.

No Drawing. Application December 22, 1928
Serial No. 328,060

19 Claims. (Cl. 260—3)

This invention relates to the production of synthetic resins and methods of making the same and has for its further object the production of such resins from thiourea or mixtures of urea and thiourea and formaldehyde.

Our invention further relates to the production of these thiourea-formaldehyde resins in a fusible, resinous, potentially reactive form whereby such products are capable of softening under the action of heat and pressure into a true plastic material which is readily moldable under such conditions of heat and pressure. We wish, therefore, to provide a mixture of reactive ingredients treated by various methods to cause the production of plastic, fusible, resinous bodies from thiourea and formaldehyde and so governing the conditions of reaction as to avoid the preliminary formation of gels and infusible products such as occur under ordinary conditions of reaction and which conditions are already well known in the prior art and therefore to produce resinous products which may readily be impregnated into various absorbent filler bodies and which may be molded with ease.

The resinous products of our choice are not only fusible, plastic reaction products from thiourea and formaldehyde having marked cementitious properties, but are also products of exceptional reactivity when heated, and, therefore, it is our aim to produce potentially reactive, fusible, plastic, cementitious, resinous bodies from thiourea and formaldehyde which, through the action of heat or heat and pressure, will be quickly converted into a final infusible, insoluble, tough, and horny reaction product which, when molded under suitable conditions, may be formed into any desired shape.

In the combination of urea or thiourea with formaldehyde at elevated temperatures, especially where a catalyst is used, great precautions are necessary inasmuch as the product has a marked tendency to go into a gel or hydrophyllic colloidal state. When the product has been formed into a gel it becomes extremely difficult to remove the mother liquor from such material consisting essentially of water and even when this water is removed it will be found that the product is either infusible or so difficulty fusible as to be almost impossible to mold by any method in common practice in the art. Where an acid catalyst is used there is a marked tendency toward the formation of a white, amorphous, insoluble and infusible reaction product. In the prior art these gels or hydrophyllic colloids of urea and/or thiourea and formaldehyde have been molded to some extent by a process of casting rather than a process of molding the products. However, since gelatinization takes place spontaneously in many cases, such a product is extremely hard to handle on a commercial scale and the production of large pieces is often accompanied by a tendency to crack, owing to unequal evaporation of the water contained in the material. This cracking has been a serious bar to the successful use of light colored urea or thiourea resins as pieces apparently well formed would generate cracks and fissures after the lapse of several weeks or months. It is because of these gel-like formations that the applicants and other workers in this art have felt for a long time that the urea and thiourea reaction products were not really resinous but were more nearly to be compared with gelatine and glue and that so soon as all the mother liquor had been dried out the materials would lack in strength because of the tendency to crack as explained previously.

In the present invention the reaction between thiourea and formaldehyde is carried out under such conditions that the production of gels will be eliminated and the removal of the mother liquor expedited and a novel means for the removal of such mother liquor without materially increasing the polymerization of the resinous products. The elimination of water, therefore, produces a resin which will not crack after being shaped, inasmuch as it is a simple matter to remove substantially all mother liquor or water present. The removal of this water is made possible, first, through the combination of ingredients; secondly, the manner of reaction, and, finally, the elimination of mass action during the water elimination stages.

We prefer to carry on the reaction between thiourea and formaldehyde in a slightly alkaline condition and preferably without the application of heat during the reaction. Thereby is produced a plastic, fusible resin substantially free from color and capable of being reproduced with great exactitude and uniformity. We do not reflux the reaction mass as it is this step which brings about the possibility of over-reaction or of local overheating during the reaction while the mass is still soluble in the mother liquor. Not only does our method greatly simplify the production of these resins, but it has marked economical advantages as the equipment necessary for the production of these materials can be provided for at relatively low cost.

Equipment required to carry out the process consists essentially of a mixing vessel wherein the reaction may be carried on and a suitable means for the removal of the water by either evaporation or distillation either enmass under ordinary atmospheric conditions or under a partial vacuum; or through the use of methods such as the freezing of the resin permitting its comminution and the elimination of the water in this manner from relatively small resinous particles or through the use of spray nozzles or centrifugal devices whereby the particle size is also reduced or through the use of absorbent reinforcing or filler materials which are impregnated with the watery solution and from which the water may be more readily eliminated because of the dispersion of the resin within these distending masses. It is possible to remove water of solution and reaction by evaporation at ordinary temperatures but this method is much slower than where higher temperatures are used or where a vacuum and higher temperature are available.

Although the ratio of formaldehyde to thiourea may be varied within fairly wide limits, we prefer to use between 1.25 and 2.0 moles of formaldehyde for each mole of urea or thiourea used. We are thus able to produce an unusually clear, brilliant resin which reacts at great speed at temperatures somewhat below 150° C. where somewhat less than two moles of formaldehyde are used for each mole of thiourea.

Where an excess of two moles of formaldehyde to the mole of urea or thiourea is used, the reactivity of the resinous product is slowed down to a considerable extent, apparently the last portions of the formaldehyde reacting very slowly at the temperatures which we employ in the production of these fusible, plastic, resinous bodies, which temperatures are preferably below 50° C.

As an accelerator, hexamethylenetetramine is of value and so are other active methylene bodies, and these products may be added to the resinous mass or to the compounds or plastic compositions formed with them if it is desired to increase the reactivity or the rate of cure of this potentially reactive product. It is to be understood, however, that these resins are in themselves potentially reactive and that the addition of these active methylene bodies is only used in the sense of an accelerator in order to increase the speed of cure and the per diem production from a mold cavity. On the other hand, the resins made entirely from thiourea and formaldehyde are extremely reactive in themselves and the curing cycle is therefore very short at temperatures above 120° C., so that in the case of the thioureaformaldehyde resins the addition of accelerators may not be necessary or desirable.

The resinous bodies may have added thereto various plasticizers of a gaseous, liquid or solid material such as waxes, metallic soaps, fatty acid bodies, fatty acid esters, camphor, chlorinated naphthalene, etc. These bodies act as softening agents and although not strictly necessary may be useful for certain technical purposes. It is likewise also possible to add various soluble dyes or mixtures of these, pigments, coloring agents, etc., in order to produce a product having the desired color characteristics. Various filling materials may be incorporated therewith, such as those of an organic or inorganic nature, such as, for example, ground paper pulp, wood flour, asbestos, mica, etc. Furthermore, these condensation products while still in water solution may be impregnated into or caused to coat or encapsule or envelop these filling materials or may be caused to impregnate various sheetlike bodies such as those of paper, cloth, grass fibres such as manila, jute, sisal, bagasse, etc. And after impregnation the water may be expelled and the products may be molded into laminated structures of various desired shapes such as flat sheets, rods, tubes, or other shapes, or the dried material may be comminuted or shredded into moldable bodies of desired shape or size. The resins in their potentially reactive, fusible form are transparent or translucent colorless to pale brownish yellow colored products. If alcohol is added before or during the removal of the water a white or translucent product is secured. Where the water is evaporated at ordinary temperatures from a mass of this condensation product the resinous body is usually an amorphous, white and somewhat crumbly material, but after melting and cooling assumes the typical resinous characteristics. The potentially reactive resins produced by our process are partially or wholly soluble in water but almost insoluble in organic solvents such as alcohol, ether, benzol and the like. Modifying agent, as before mentioned, may be added at any convenient time, but it is preferable to add water insoluble modifying agents after a considerable portion of the water has been removed. This may be done when the reaction mixture has become thick and viscous due to the removal of water, or the products may be added even after substantially all of the water has been removed as by mechanically mixing the modifying agent or agents with the resin. Dyes or pigments can also be added under similar conditions.

While the potentially reactive resin may be molded or cast into useful objects without the addition of suitable filling or extending materials, for most purposes, however, it is technically desirable that such filling materials be added and that the resinous body therefor form the cementitious coating medium for such fillers. The filling materials moreover, act as solid modifying agents in that the shrinkage is greatly reduced and the tensile strength and shock resistance increased through their use. The filling materials may be impregnated or coated with the watery resinous solution or they may be mixed in a dry condition with the finely pulverized resin or this dry mixture of resin may be treated on differential rolls to more thoroughly incorporate the mass with the resin and to reduce the bulk of such mixture.

In order to make our invention clear, the following examples are given by way of illustration, the portions specified being all by weight:

( *Example 1*

One part of barium hydroxide is dissolved in 160 parts of 36% formaldehyde solution. 120 parts of thiourea are then added and the mixture stirred. The temperature of the solution at first drops, due to the absorption of heat by the thiourea going into solution. The temperture soon rises, however, due to the heat of the reaction of the thiourea and formaldehyde. If the original temperatures of all of the materials used is approximately 20° C., the maximum temperature reached during the reaction may be as high as 40° C. or even higher. It is preferable, but not at all essential, that the temperature of the reaction mixture be held below 40° C. by cooling the mixture during the reaction if necessary. In any case, no heat is used in bringing about this reaction other than that generated by the reaction itself.

The reaction is apparently complete in about two hours. The clear solution may be kept over long periods of time without harm. There is some tendency, however, to develop slight acidity, so that it is preferable to add about two parts of ammonia solution (specific gravity 0.9).

In order to hold the solution nearly neutral, carbon dioxide is passed in. This serves a double purpose in precipitating out the barium as barium corbonate, and forming ammonium carbonate which acts as a buffer to hold the solution substantially neutral during the evaporation of the water.

In some cases after following the above procedure the water was removed by boiling in an open evaporator. A thermometer inserted in the boiling solution showed a maximum boiling point 106° C., at which time substantially all of the water of solution and reaction had been removed.

Care must be taken if the water is removed by this process, since there is a considerable tendency to foam during the last stages. If overheating occurs where the heat is applied to the evaporation vessel, the resin will cure to its infusible form in a layer over the vessel. This is indicated by a drop in the temperature of the solution, due to the poor heat transference of the cured portion of the resin.

The resin, which is very viscous at 106° cools to an almost colorless brittle product which is potentially reactive.

The clear solution, preferably stabilized and preferably treated with carbon dioxide, will keep over long periods of time at ordinary room temperature and is, therefore, valuable as a varnish or coating material or may be used for the purpose of impregnation into various sheetlike bodies such as paper, cloth, asbestos, etc., the water being evaporated and the sheetlike material may be pressed into form of any desired shape. The clear varnish makes it possible to ship the product to the ultimate user, and when properly stabilized makes a material of considerable value to the fabricators of laminated material, etc.

Example 2

1 part of barium hydroxide, 104 parts of 36% formaldehyde solution, 160 parts of thiourea.

As in Example 1, the barium hydroxide is dissolved in the formaldehyde and the thiourea added. The mixture should be stirred until all of the thiourea is in solution. The solution first cools and then warms up during the reaction. In about two hours the reaction is apparently complete, but it is usually convenient to allow the solution to stand over night.

25 parts of hexamethylenetetramine is added to the solution and carbon dioxide passed in until the solution is neutral to litmus. Besides the barium carbonate, where commercial formaldehyde is used, there is usually a small amount of colored insoluble material present. Where a very light colored resin is desired, the solution should be filtered or centrifuged.

The water is then evaporated from the filtered solution by boiling in an open evaporator. When the temperature reaches about 100° C., the product has a tendency to turn milky, but this may be disregarded. Evaporation of the water is continued until a product of the desired viscosity is obtained. Since this resin cures at temperatures above about 110°, care must be used during the last stages of evaporation.

Example 3

Place in a suitable mixing device,

|  | Parts |
|---|---|
| Thiourea | 305 |
| Urea | 120 |
| 36% formaldehyde solution | 835 |
| Ammonia solution (sp. gr. 0.9) | 8 |
| Calcium hydrate (Ca(OH)$_2$) | 1 |

Agitation should be started as soon as the calcium hydrate has been added. A reaction starts almost as soon as the calcium hydrate is added, the mixture warms up and both the urea and thiourea go into solution.

The addition of ammonia is desirable but not essential. Where ammonia is not used, the formaldehyde solution should be neutral, or slightly alkaline. In any case the solution should be sufficiently close to the neutral point that it becomes alkaline to litmus upon the addition of one part of calcium hydrate or of calcium oxide to the quantities of formaldehyde, urea and thiourea shown in this example. Rather than adjust the hydrogen ion concentration of the solution, it is more convenient to add ammonium hydroxide solution. A greater amount than 8 parts of ammonium hydroxide may be added, if desirable, without changing to any appreciable extent the nature of the product.

The initial reaction is usually complete in about two hours, but the solution should preferably stand eight hours or longer before the water is removed in order that additional polymerization may take place. Carbon dioxide may be passed in and the solution filtered or centrifuged where a very clear colorless product is desired.

The water may be rapidly and conveniently removed by distillation, preferably under reduced pressure. During the removal of the last portions of the water, foaming is likely to occur, due to the high viscosity of the solution. This tendency to foam can be very largely prevented by the addition of a very small amount of paraffin. Usually an amount of paraffin equivalent to less than 0.01% of the weight of the batch is ample to prevent excessive foaming. Other well known oily or water insoluble materials may be substituted for the paraffin for the purpose of reducing the tendency to foam.

Where a vacuum distillation is used to remove the water, the solution may be heated more rapidly without danger of curing the resin than is the case where no vacuum is used. In any case the solution should not be heated above 110° C. for any period of time, as there is danger of the resin going over to the insoluble infusible state above this temperature. Samples removed from time to time during the distillation of the water show a product of increasing hardness. Toward the end of the distillation the temperature rises more rapidly and the rate of distillation decreases. Where a hard grindable resin is desired, the temperature of the resin may be allowed to raise as high as 105° C. toward the end of the distillation in order to drive off substantially all of the water.

Example 4

Place in suitable mixing device

|  | Parts |
|---|---|
| 36% formaldehyde solution | 800 |
| Thiourea | 600 |
| Barium hydroxide | 3 |

As soon as the barium hydroxide is added, agitation is started. A reaction starts very quickly and the thiourea goes into solution. Although thiourea has a negative heat of solution and causes the solution to cool while it is dissolving, the reaction between the thiourea and formaldehyde is an exothermic one. The sum of these two effects is exothermic so that the final temperature of the mixture is higher than the initial temperature. The temperature seldom rises above 40° C. where the initial temperature of the materials is below 20° C. but the height to which the temperature rises depends partly upon speed of the reaction and partly upon the rate at which heat is transferred from the reaction mass. Under ordinary conditions no provisions need be made for either heating or cooling the mixture during this reaction.

The initial reaction is apparently completed in about an hour or even less. While the water of solution and of reaction may be removed as soon as this reaction is completed, we prefer to allow the solution to stand for six hours or longer before completing the process. It is usually convenient to allow the solution to stand over night.

After standing, ten parts by weight of ammonia solution (specific gravity 0.9) is added, and then carbon dioxide passed in until the solution is substantially neutral toward litmus paper. The barium is precipitated as barium carbonate and may be filtered off.

The water may be conveniently removed by distillation, preferably under reduced pressure, as described under Example 3. Instead of removing the water at this point, the solution may be used for impregnation of fibrous materials, as for example paper pulp, and the water evaporated from the impregnated material and the product ground to a powder if desired.

While we have herein shown and described certain preferred embodiments of our invention, we wish it to be understood that we do not confine ourselves to all of the precise details herein set forth, as modifications and variations may be made without departing from the spirit of the invention or exceeding the scope of the appended claims. For example, bases other than calcium or barium may be used, provided they give, when in solution, a hydrogen ion concentration comparable to that of calcium or barium hydroxide. Ammonia itself is not satisfactory, however, since it reacts directly with the formaldehyde to form hexamethylenetetramine. Sodium or potassium hydroxide may be used in small quantities, but they have the disadvantage of forming water soluble salts which are difficult to remove.

Various fillers, such as wood flour, cellulose, asbestos, and the like, may be incorporated with the resin herein described to produce molding compositions. For especially light colored or white molded objects, light colored or white fillers such as bleached paper pulp should be used.

While the removal of water from condensation products of urea, thiourea or mixtures of urea and thiourea and fomaldehyde may be accomplished by distillation or evaporation as given in the preceding examples, it will be found that the low heat conductivity of the resinous mass makes it extremely difficult to remove sufficient quantities of water to make a product of the highest grade from the standpoint of moldability, surface finish and electrical properties. While the prior art has produced commercial forms of resins from these materials where the water is removed by distillation or evaporation, it will be found upon tests that such water content runs close to 12% of the weight of resin contained in the composition, and it will likewise be found that articles molded from such composition will have a surface lacking smoothness because of the accumulation of gases due to the high volatile content contained therein. If an effort is made to decrease the percentage of volatile, the product will not be sufficiently plastic to mold properly. While the examples we have given eliminate the formation of gels and hydrophyllic colloids, we find, likewise, that it is extremely difficult to remove the final traces of mother liquor or water and that if heating is carried on for a sufficient length of time the resin becomes darker and the flow is likewise decreased. We have found, however, that by decreasing the size of the resinous particles at the time of the removal of the moisture, this operation is greatly simplified and a much greater percentage of mother liquor may be removed.

We have found that by freezing the watery solution to a point where the product is hard and brittle, we can pulverize the resin and ice in most any impact pulverizer and we can then carry the mixture through currents of air as by air flotation until substantial amounts of mother liquor have been removed, whereupon the suspended resinous mass is separated as in a cyclone separator and will be found to have had the moisture removed therefrom and to retain its powdered condition at ordinary room temperature. As the resin particles are constantly in motion while being floated in the air currents, the air current may be heated somewhat above room temperature without causing the particles to cohere. With this method we find that it is possible to definitely stop the condensation at a preferred point by freezing the mass and that the mass so frozen is in ideal condition to be pulverized and to release its moisture to the air. The material is extremely light in color and successive batches of material may be produced with great uniformity. The material may be made to have a very low melting point and will therefore be found suitable for impregnation of various comminuted filler materials or for the impregnation of various sheetlike bodies which may be molded in this condition or which may be subsequently comminuted or shredded as the case may be.

In place of freezing the products, we find that the liquid material is so free from any gel formation that it may be sprayed through a suitable nozzle into a heated room or into a heated air cyclone separator or into currents of heated air, whereby the finely atomized spray of resin and mother liquor will be quickly dried and the resin may be separated from the air in any well known manner as through the use of a cyclone air separator. Instead of using a nozzle, we find that the liquid may be caused to be fed on to a rapidly revolving disc whereby the spray may be produced through centrifugal force and the material again carried through air currents to be dried. It is the solution free from gels which makes this method possible, whereas the freezing method which we have developed is equally applicable to most any form of resin product even though gels have been produced.

The freezing and spraying methods for the drying of condensation products of urea, thiourea of urea and thiourea when combined with formaldehyde or other suitable aldehyde are applicable for the drying of these resinous products when made by other methods, and these methods of drying are useful in the art because they permit the ready elimination of the mother liquor from any condensation products of urea or urea derivatives, whether in solution or in gel form. As a matter of fact, it is possible to produce usable plastic resins in accordance with the teachings of the prior art where the water of solution and reaction is removed in accordance with our methods.

Thiourea resins and, for that matter, resins of urea and its other derivatives are of great use in the arts, but the removal of water from these condensation products has been a bar to their commercial success. We find that the laminated products of paper and cloth are extremely tough, strong and hornlike. They may be readily machined, cut, punched, etc., and because they are odorless, they may be used for many purposes for which the phenol-aldehyde resins could not be used. The products will stand the electric arc to better advantage than will the phenol-aldehyde condensation products. Furthermore, the material does not have a tendency to fog photographic emulsions, films, plates, etc., and for this reason the laminated products may be used for the production of plate holder and film pack slides for cameras, and the laminated products or the comminuted products may be used for the purpose of molding camera bodies, etc. into the desired shape, colored or mottled to form a completely dimensioned article. This has not heretofore been possible with phenol-aldehyde products because of the tendency to fog the sensitive emulsions. With the increased use of movie cameras and similar cameras for home use, it is possible to cheaply produce the rigid structures from a tough, strong product capable of reproducing any desired finish at a considerable saving in cost. Gears may be made of the product and most particularly gears, pulleys and spools for the photographic instrument maker.

The free flowing qualities of our resin because of its freedom from gel makes it possible to utilize our potentially reactive resins and compositions made from them for the purpose of molding objects under hydrostatic pressure. The resin or composition may be placed into a suitable primary pressure chamber which may preferably be heated and pressure may be applied thereon to cause such material to flow through an orifice from such primary pressure chamber into a secondary pressure chamber defining a mold cavity wherein the material may be formed, shaped and hardened. This offers great advantages inasmuch as the mold cavity may remain closed while receiving the material and, therefore, molded pieces of great exactitude dimensionally and of high finish, free from surface blemishes, may be reproduced. As the mold is so arranged that gases and vapors may readily escape therefrom, the high surface finish is readily produced. A thiourea derivative resin capable of being molded under hydrostatic pressure generated upon and within the molding plastic offers further advantages inasmuch as the mold cost and the maintenance of molds is greatly reduced and, therefore, a product of this kind becomes very valuable for the purpose of molding various objects including those of large dimensions, such as furniture, bedsteads, etc.

The liquid condensation material is very valuable for the impregnation of coil windings for motors, transformers, etc., as the resin has a high electrical resistance and will meet the technical conditions for this purpose very satisfactorily. Furthermore, the solvent for the product being water, which may readily be eliminated, permits the use of extremely cheap solvents for this purpose. Therefore, the liquidlike condensation product has been found to be very useful for impregnating and strengthening these coil windings.

The free flowing qualities of the synthetic resin and its low melting point through the manner of processing and the elimination of gels makes the product very desirable for the purpose of bonding together motor and generator commutators, etc. The free flowing qualities of the product, furthermore, make it possible to admix various heat resisting materials such as asbestos or mica with the cementitious resin while still maintaining a free flowing condition, and, therefore, it is quite applicable for use in the treating of these commutators by the usual molding methods. However, the free flowing qualities of the product make it possible to utilize the primary pressure chamber method from which the material is forced under pressure into a secondary pressure chamber defining a mold cavity and holding the commutator segments and insulation in properly spaced relation to each other in order that the cementitious material admixed with fillers may be forced into this secondary chamber under hydrostatic pressure and the filling material be formed to maintain the commutator segments and insulation in the desired spaced relation to each other and to anchor and bind the component parts of the commutator in any suitable manner. This greatly simplifies the process of molding commutators.

What we claim is—

1. A water solution comprising a resinous condensation product of thiourea and formaldehyde stabilized with ammonia and carbon dioxide to maintain said product in an acid free condition and substantially free from gel, said solution being capable of readily liberating its volatile constituents.

2. A water solution comprising a resinous condensation product of thiourea and formaldehyde stabilized with ammonia and carbon dioxide to maintain said solution in an acid free condition and being free from gel, being capable of impregnation into absorbent filler bodies and from which the volatile constituents may readily be removed to produce a substantially anhydrous, potentially reactive, moldable plastic composition, capable of setting under the subsequent action of heat and pressure into an infusible, hard and set final product.

3. A water solution comprising a resinous condensation product of thiourea and formaldehyde stabilized by ammonium carbonate to maintain said product in an acid free condition and capable of impregnating fibrous products which are subsequently to be formed into mechanical shapes for use in photographic equipment and being capable of assuming a hard, set and infusible form upon the application of final heat and pressure treatment.

4. A condensation product of thiourea and formaldehyde stabilized by ammonium carbonate to maintain an acid free condition and being substantially free from gel products and readily convertible into a substantially anhydrous, infusible and set product upon subsequent application of heat and pressure.

5. The herein described process of making a potentially reactive synthetic resinous reaction product of thiourea and formaldehyde comprising mixing less than two moles of formaldehyde with each mole of thiourea and adding thereto a sufficient quantity of an alkali earth metal base to cause a reaction to take place without heating the mixture, allowing the resulting solution to stand for a period longer than one hour, adding ammonia to the solution and then a weak acid material capable of simultaneously precipitating the alkali earth metal base and neutralizing the solution until the solution is substantially neutral.

6. The herein described process of making a potentially reactive synthetic resinous reaction product of thiourea and formaldehyde comprising mixing less than two moles of formaldehyde with each mole of thiourea in the presence of an alkaline earth metal base which causes a reaction to take place without heating the mixture, allowing the mixture to stand for a period longer than one hour, adding ammonia to the solution and then adding carbon dioxide until the solution is substantially neutral to litmus.

7. The herein described process of making a potentially reactive synthetic resinous reaction product of thiourea and formaldehyde comprising mixing less than two moles of formaldehyde with each mole of thiourea in the presence of an alkaline earth metal base which causes a reaction to take place without heating the mixture, allowing the mixture to stand for a period longer than one hour, adding ammonia to the solution and then adding carbon dioxide until the solution is substantially neutral to litmus, filtering from precipitated alkaline earth metal carbonate or other insoluble material.

8. The herein described process of making a potentially reactive synthetic resinous reaction product of formaldehyde and thiourea which comprises reacting less than two moles of formaldehyde with each mole of thiourea in the presence of an alkaline earth metal base, adding ammonia and adding carbon dioxide to the solution until the alkaline earth metal has been precipitated and the solution has become substantially neutral.

9. The herein described process of making a potentially reactive synthetic resinous reaction product of formaldehyde and thiourea which comprises reacting less than two moles of formaldehyde with each mole of thiourea in the presence of an alkaline earth metal base, adding ammonia and adding carbon dioxide to the solution until the alkaline earth metal has been precipitated and the solution has become substantially neutral.

10. A water solution comprising a resinous condensation product of thiourea and formaldehyde stabilized by forming ammonium carbonate in situ from ammonia and carbon dioxide to maintain said product in an acid free condition and substantially free from gel, said solution being capable of readily liberating its volatile constituents.

11. The herein described process which comprises reacting formaldehyde with urea in the presence of an alkali earth metal base, removing substantially all of the metal ions associated with said base, and forming ammonium carbonate in situ by adding ammonia and carbon dioxide in such proportions as to render the solution of the reaction product substantially neutral.

12. The herein described process which comprises reacting formaldehyde with a mixture of urea and thiourea in the presence of an alkali earth metal base, removing substantially all of the metal ions associated with said base, and forming ammonium carbonate in situ by adding ammonia and carbon dioxide in such proportions as to render the solution of the reaction product substantially neutral.

13. A water solution comprising a resinous condensation product of thiourea and formaldehyde stabilized with ammonia and carbon dioxide to maintain said product in a substantially acid free condition from which solution the volatile constituents may readily be removed to produce a substantially anhydrous potentially reactive resinous composition capable of setting under the subsequent action of heat and pressure to an infusible, hard and set final product.

14. A water solution comprising a resinous condensation product of urea and thiourea with formaldehyde, stabilized with ammonia and carbon dioxide to maintain said product in a substantially neutral condition, said solution being capable of readily liberating its volatile constituents.

15. A water solution comprising a resinous condensation product of urea and thiourea stabilized with ammonia and carbon dioxide to maintain said solution in a substantially neutral condition, said solution being capable of impregnation into absorbent filler bodies from which the volatile constituents may readily be removed to produce a substantially anhydrous, potentially reactive, moldable plastic composition capable of setting under the subsequent action of heat and pressure into a infusible hard and set final product.

16. A condensation product of urea and thiourea with formaldehyde stabilized with ammonium carbonate to maintain a substantially acid free condition, and readily convertible into a substantially anhydrous, infusible and set product upon subsequent application of heat and pressure.

17. The herein described process which comprises reacting formaldehyde with urea in the presence of an alkali earth metal base, adding ammonia to the solution and simultaneously neutralizing said base and removing the alkali earth metal ions by means of a weak acid capable of forming a substantially insoluble alkali earth metal salt, and forming a soluble ammonia salt to provide a substantially neutral aqueous solution of said reaction product.

18. The herein described process which comprises reacting formaldehyde with urea and thiourea in the presence of an alkali earth metal base, adding ammonia to the solution and passing in carbon dioxide to precipitate the alkali earth metal and form ammonium carbonate to provide a substantially neutral aqueous solution of the reaction product.

19. The herein described process which comprises reacting formaldehyde with urea in the presence of an alkali earth metal base, adding ammonia to the solution and passing in carbon dioxide to precipitate the alkali earth metal and form ammonium carbonate, and removing the insoluble material from the resulting solution.

EMIL E. NOVOTNY.
WILLIAM COURTNEY WILSON.